United States Patent [19]
Antoline et al.

[11] Patent Number: 6,042,191
[45] Date of Patent: Mar. 28, 2000

[54] HIGH WALL MINING SYSTEM

[75] Inventors: Steve Antoline, Richmond, Ky.; Paul van Es, Vught, Netherlands

[73] Assignee: Superior Highwall Miners, Inc., Beckley, W. Va.

[21] Appl. No.: 09/116,233

[22] Filed: Jul. 16, 1998

Related U.S. Application Data

[62] Division of application No. 08/744,431, Nov. 8, 1996, Pat. No. 5,938,289.

[51] Int. Cl.[7] .............................. E21C 29/00; E21C 35/20
[52] U.S. Cl. ................................................ 299/67; 198/583
[58] Field of Search .................................... 198/583, 584, 198/588, 594; 299/18, 56, 64, 67

[56] References Cited

U.S. PATENT DOCUMENTS

| | | | |
|---|---|---|---|
| Re. 31,622 | 7/1984 | Todd | 299/1 |
| 2,872,170 | 2/1959 | Alspaugh et al. | 299/30 |
| 4,387,798 | 6/1983 | Jamison et al. | 198/587 |
| 4,952,000 | 8/1990 | Lipinski et al. | 299/1 |
| 5,112,111 | 5/1992 | Addington et al. | 299/18 |
| 5,232,269 | 8/1993 | Addington et al. | 299/67 |
| 5,609,397 | 3/1997 | Marshall et al. | 299/67 |

Primary Examiner—Eileen Dunn Lillis
Assistant Examiner—Sunil Singh
Attorney, Agent, or Firm—William L. Krayer

[57] ABSTRACT

A conveyor unit for a high wall mining system; a mining system employing a train of such units. The conveyor units are pushed in tandem into the mine. The system contemplates a motor mounted on a cutter at the head of the train; through a series of shafts and clutches, serially through the train of conveyor units, rotation power is transferred mechanically from the motor to turn the conveyor belts of the individual units. The mining system includes a preferred coupling/clutch apparatus and a launch vehicle for adding conveyor units to the train which has the ability to start the rotation of the conveyor belt on the new unit as it is added.

2 Claims, 9 Drawing Sheets

HIGH WALL MINING SYSTEM

This application is a divisional of U.S. application Ser. No. 08/744,431, now U.S. Pat. No. 5,938,289, filed Nov. 8, 1996.

TECHNICAL FIELD

This invention relates to mining, particularly to the mining technique known as high wall mining, which is used primarily in the mining of coal. The invention is a system for efficiently extending the reach of conveying equipment between the remote cutter drum and the launch vehicle, and efficiently conveying coal or other mined material from the cutter drum through the length of a hole cut into the side wall of earth.

BACKGROUND OF THE INVENTION

High Wall Mining is a term applied to various approaches to removing coal and other desired materials in seams or veins under an overburden too deep to justify strip mining. The term is applicable where the appropriate machinery can be present in a cut or bench and extend a mechanism, including a conveyor and terminating with a cutter head or drum, generally horizontally into the vein or seam under a high overburden. The process normally leaves extended pillars between the generally horizontal extended holes, Such parallel horizontal holes and extended pillars are depicted by Todd in his disclosure in U.S. Pat. No. 4,014,574 of a "Mining Machine Having Rectangular Thrust Transmitting Conveyor Column." Todd employs a "non-thrust-transmitting" screw conveyor to move the cut material out of the hole.

An early patent by Osgood, U.S. Pat. No. 2,415,217, describes the powering of an initial. conveyor belt by a motor mounted on the cutter unit, which also provides forward thrust (col. 3 lines 62 et seq; col 6, lines 50 et seq).

Conveyor belt frame modules are advanced with the cutter head by Brais in U.S. Pat. No. 4,890,720, permitting a single long conveyor belt to be used over several modular units. Such a system requires an independent means for moving the frame modules over the belt to the advancing head of the train, and is not practical in high wall mining.

In U.S. Pat. No. 5,112,111, Addington et al describe interconnected conveyor units for moving the cut material along the cutting extension for recovery. The conveyor units are individually powered, i.e. each has its own motor and gear box for moving the conveyor belt. See also Addington et al U.S. Pat. Nos. 5,261,729, 5,232,269, and 5,364,171, and the individually powered conveyor units of Bargel et al in U.S. Pat. No. 3,992,060. A power system such as Addington's requires manually connecting the motors in series as the conveyor units are placed in tandem, which means that power connections must be made at the unit al.ready in place as well as on the new unit; each of the heavy, bulky explosion-proof electric cable connections must be separately secured manually and comply with safety regulations. Each time a new segment is added to the conveyor system, delays occur clue to the time required for the manual connections as is common in conventional systems.

SUMMARY OF THE INVENTION

The present invention is a system for conveying coal through a horizontal mine such as is employed in high wall mining. The system permits the addition of new conveying segments with minimal disruption of operations and with no manual connection.

In our system, a single motor for the conveyor belts is mounted on the cutter head unit, and the conveying units attached in tandem to it are all powered by the motor on the cutter head unit, the mechanical force for the conveyor belts being transmitted through shafts and flexible couplings/clutches at each connection.

The cutter head unit may be any apparatus capable of cutting coal or other desired material from a seam and placing it on the initial end of a conveyor unit, such as, for example, the cutter head units disclosed by Rauch et al in U.S. Pat. No. 3,860,291, Addington U.S. Pat. No. 5,112,111, or Osgood in U.S. Pat. No. 2,415,217.

Connection between the conveyor units, and from the cutter head unit to the initial conveyor unit, is made using an elongated member on one end of the conveying unit and a receptacle for it on the connecting unit so that little guidance is required.

Our system permits minimal disruption of operations even when new conveyor units (push beams) are being placed in sequence for use.

Our coal conveyor unit employs a unique coupling concept which features transmission of rotational force rather than electrical power to each conveyor unit, thus permitting the use of a single large, more efficient, electric motor on or near the cutter head. Because our coupling system is simple and coupling is easily accomplished without manual labor, the time required for adding segments to the conveying system is greatly reduced. Our invention includes a particular specially designed spring centered pilot coupling device and a specially adapted long drive shaft system that is flexible for mounting and to allow beam deflection. Each coal conveyor unit includes a rotatable shaft extending its full length. On each end of the shaft is a coupling device, one including an elongated member or pilot pin and the other a complementary socket; in each case they are attached to the shaft through a universal joint. Surrounding the universal joint is a helical spring compressed between flanges. This construction tends to center the orientation of the universal joint while permitting the flexibility needed to assure a good connection when misalignment is encountered from one unit to the next.

Normally the entire train of conveyor units (push beams) is pushed into the seam from a source of thrust outside the mine. However, our invention is not limited in its application to machines wherein the thrust force, i.e. the force which impels the cutter drum into the coal seam, is applied from a launch vehicle or the like, but may as well be used where the cutter head or drum is supplied with traction and its own power for movement into the seam.

BRIEF DESCRIPTION OF THE DRAWINGS

Our invention will be described with particular reference to the following drawings, in which:

FIGS. 4*a* and 4*b* provide more detail in the side and overhead views of the conveyor unit, while

DETAILED DESCRIPTION OF THE INVENTION

Figure 1:
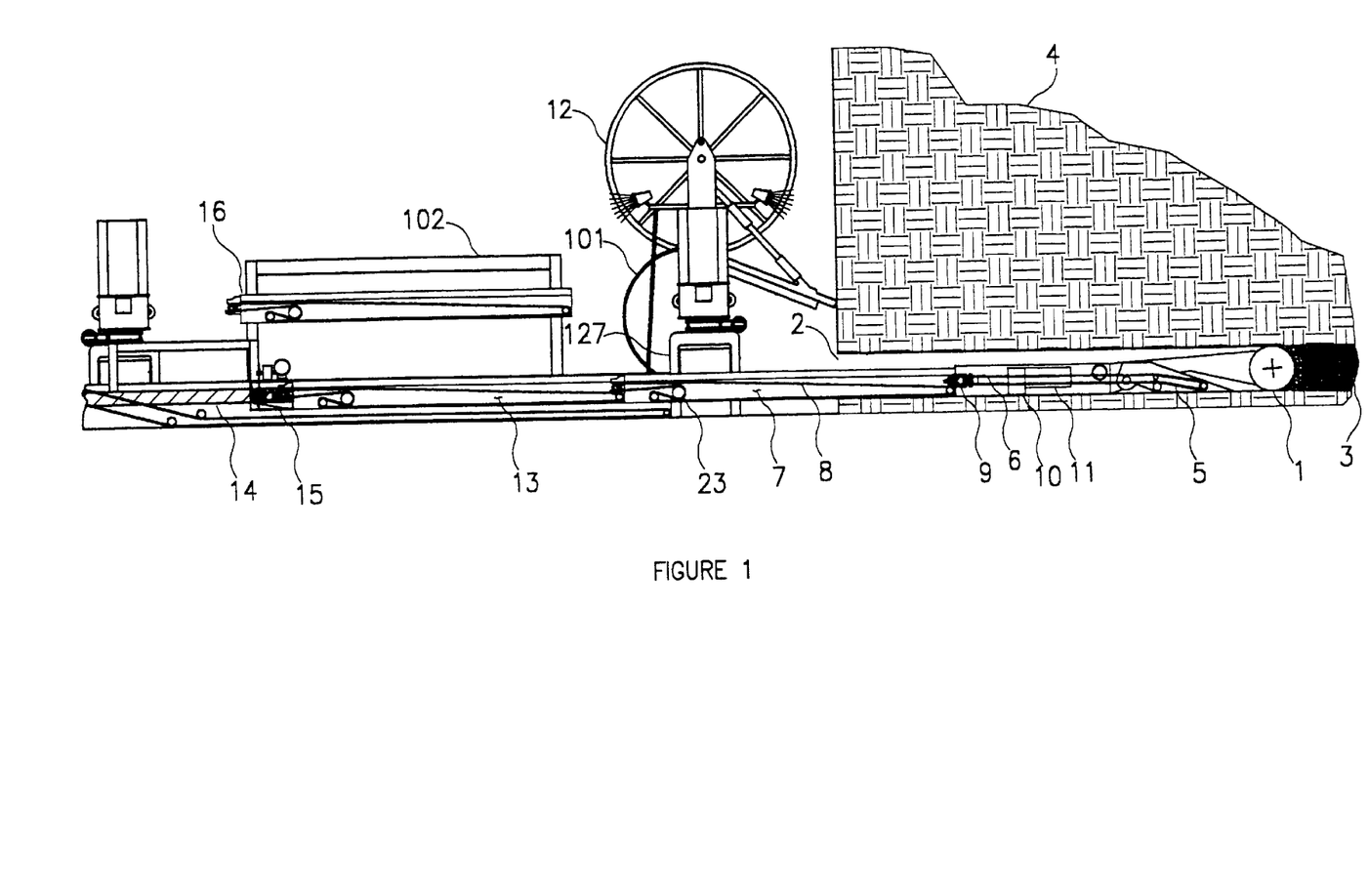
FIG. 1 is a simplified side view of a high wall mining machine equipped with our invention, showing the cutter drum and two push beams (conveyor units) in place for operation.

Referring now to the drawings, in FIG. 1, cutting drum 1 is seen to be embedded in mine 2 for removing coal from coal seam 3 located in earth 4. The cutting drum 1 is mounted on cutting head unit 5, which has a chain belt conveyor 6 for clearing cuttings from the mine 2 by delivering them to further conveying means as explained below.

As the objective is to follow the coal seam 3 as far into the earth 4 as possible, the machine is equipped to supply a series of conveyor segments or units, also known as push beams because the machine forces, or pushes, them into the mine in the direction of the cutting drum 1. The first conveyor unit 7 is attached directly to the cutting head unit 5. On cutter head unit 5, motor 11, operating through gear reducer 10, turns a shaft not seen here on the end of which is coupler/clutch 9 for continuing the transmission of the rotational force through shaft 29 (see FIG. 4*b*) mounted in conveyor unit. 7. The conveyor unit 7 carries a conveyor belt 8 which receives its power through drive roll 23 from engagement with shaft 29 (FIG. 4*b*) which, as indicated above, is turned by coupler/clutch 9 on the cutting head unit 5—see also FIGS. 4*a*, 4*b*, 4*c*, 5*a*, 5*b* and 6 showing the details of coupling one conveyor unit to the next and the serial powering of the belts from one unit to the next. Conveyor belt 8 is positioned to receive coal from chain belt conveyor 6. (For the sake of clarity, coal is not shown on the belts). Coupler/clutch 9 is in turn connected to gear reducer 10 and motor 11, also mounted on cutting head unit 5. Thus motor 11, while situated on cutting head unit 5, provides the rotation force for the drive roll 23 on conveyor unit 7, and, as will also be seen in greater detail below, also provides the rotational force for all other belt drives in the train of conveyor units.

Storage reel 12, located on launch platform 127, is prepared to unroll hydraulic and electric power lines 101 into a trough (not shown) on conveyor unit 7, for supplying power to motor 11 as well as the drive for the cutting drum 1 as they advance into seam 3.

New conveyor unit 13 has just been moved into contact with conveyor unit 7 by the pushing action of cylinder 14, powered by power head 15. Above new conveyor unit 13 and slightly to its left is depicted next sequential conveyor unit 16. Apparatus for manipulating conveyor units 13 and 16 is not shown except frame 102, and may be any suitable such apparatus.

Figure 2:
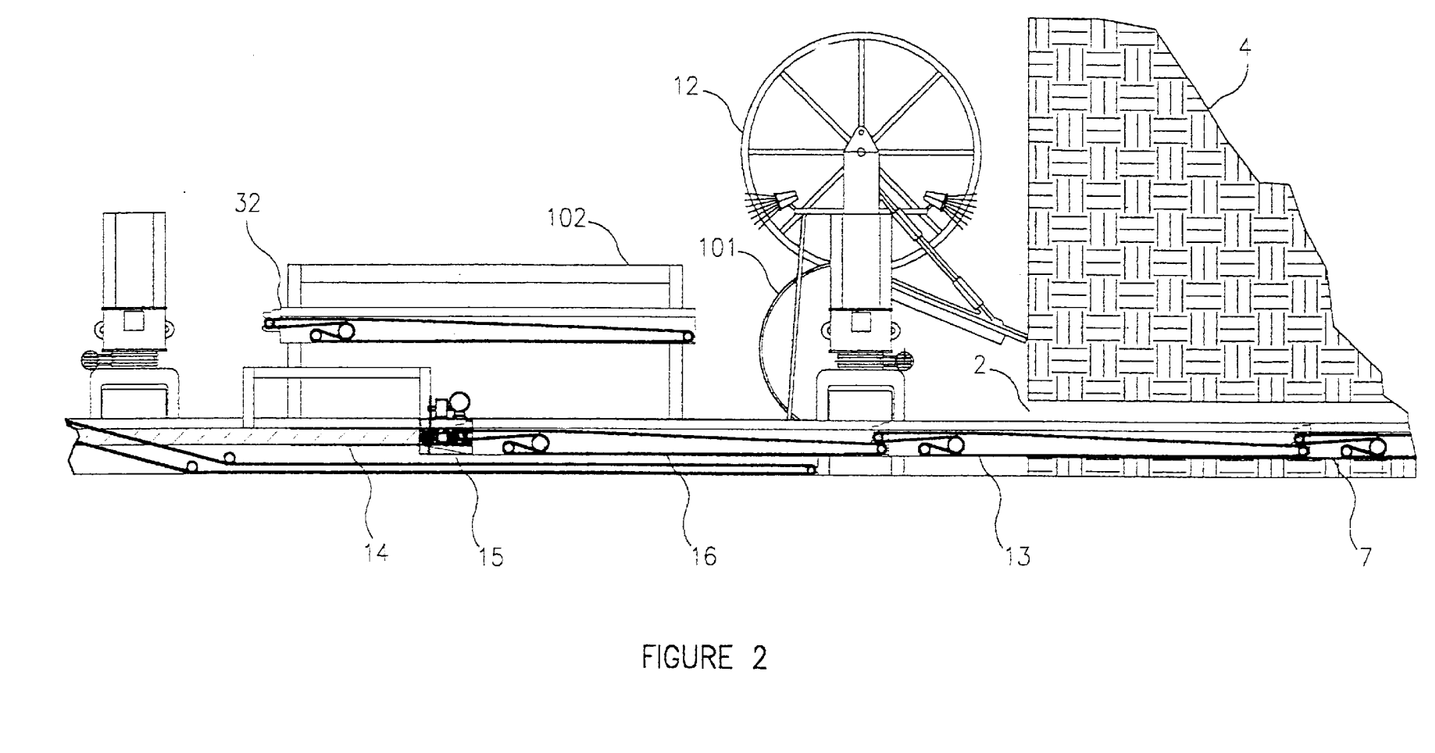
FIG. 2 is similar to FIG. 1, but shows movement of the mining apparatus into the coal seam.

FIG. 2 illustrates the invention at a point at which the first conveyor unit 7 has been moved into the mine 2, causing the cutting head unit 5 (FIG. 1) to advance farther into mine 2. New conveyor unit 13 is attached directly behind conveyor unit 7 as in FIG. 1, together with next sequential conveyor unit 16, which has also been moved to the right by the pushing action of cylinder 14, powered by power head 15. Above conveyor unit 16 and slightly to its left is depicted yet another conveyor unit 32.

Each of the conveyor units (push beams) in practice is desirably about twenty feet (6.09 meters) long, but may as a practical matter range from ten to forty feet long or more.

Figure 3A:
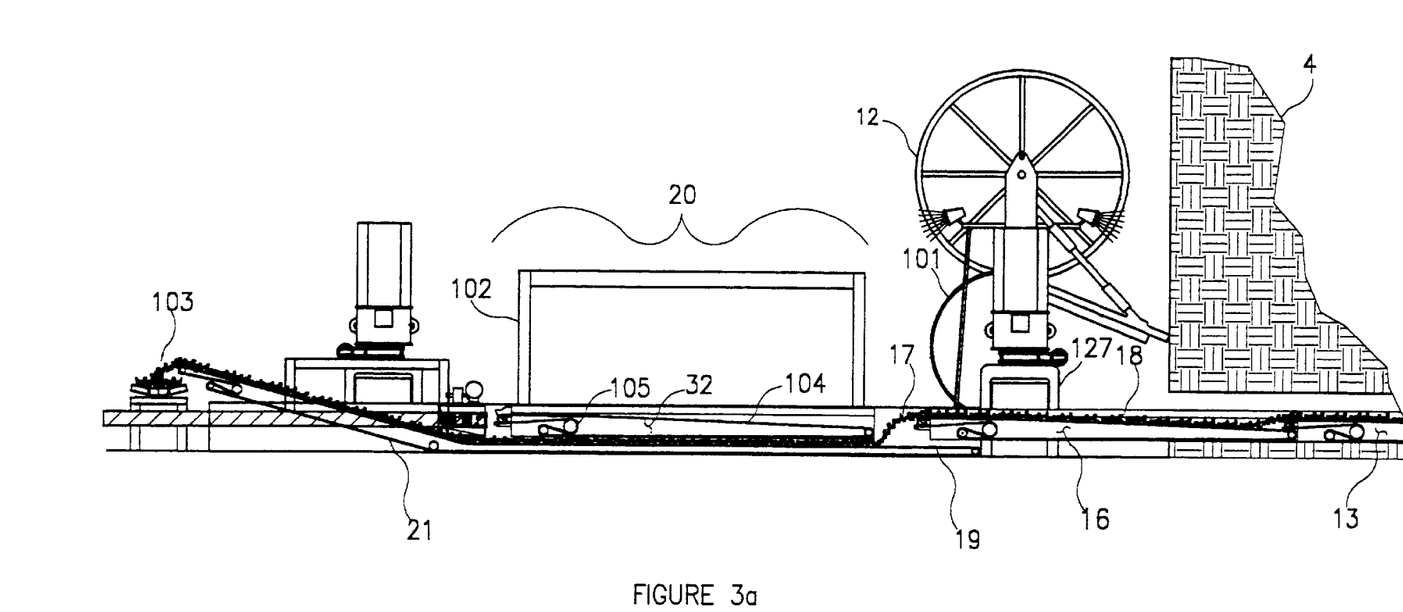
FIG. 3a shows the next step in the sequence of adding a new conveyor unit—here the coal is seen to be continuously conveyed while a third conveyor unit is positioned and added to the train.

In FIG. 3*a*, conveyor unit 16 is seen to have moved into the mine. The next conveyor unit 32 has been lowered but has not yet made contact with conveyor unit 16, however, and accordingly coal 17 may be seen falling from conveyor belt 18 of conveyor unit 16 onto underbelt 19. Underbelt 19 passes under the entire launch section 20 and includes an inclined section 21 leading to a terminal conveyor 103.

A continuous flow of coal is assured not only by the presence of underbelt 19, which receives coal while the next conveyor unit 32 is moved into place, but also by the ability Lo start the rotation of belt 104 on conveyor unit 32 before it is put in place in the train of conveyor units, where it with derive the rotating force for drive roll 105 from conveyor unit 16 in front of it as it is pushed into the mine.

Figure 3B:
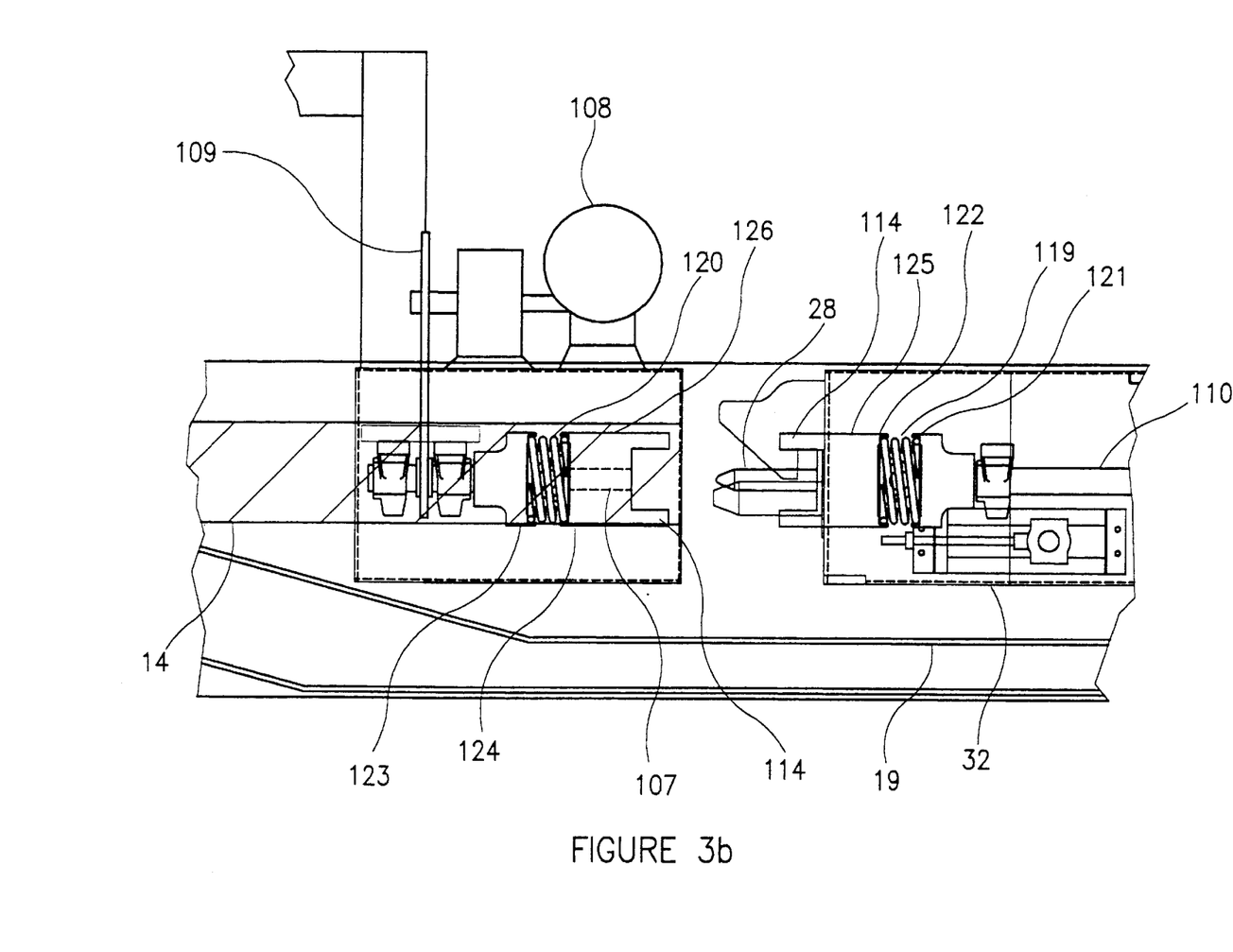
FIG. 3b is an enlarged portion of FIG. 3a, showing the apparatus for commencing movement of a belt before its conveyor unit is completely attached to the train.

As illustrated in FIG. 3*b*, the starting of belt rotation on conveyor unit 32 is accomplished by the coupling of elongated member 28 on conveyor unit 32 to socket 107 on the end of coupler body 126. Cylinder 14 moves toward conveyor unit 32. Upon engagement, coupler body 126 and coupler body 125 are caused lo rotate by a chain drive 109 from motor 108 mounted on power head 15. After coupling, the shaft 110 is rotated through the action of motor 108 through chain drive 109 and interlocking teeth 114, further illustrated in FIG. 6. Springs 119 and 120 are compressed, respectively, between flanges 121 and 122, and 123 and 124. The springs 119 and 120 surround universal joints (hidden from view); their function is to orient the coupling bodies 125 and 126 in a central or straightforward positions in spite of the complete flexibility of the universal joint, while enabling the insertion of elongated member 28 into socket 107 even though there may be some misalignment.

Figures 4A, 4B:
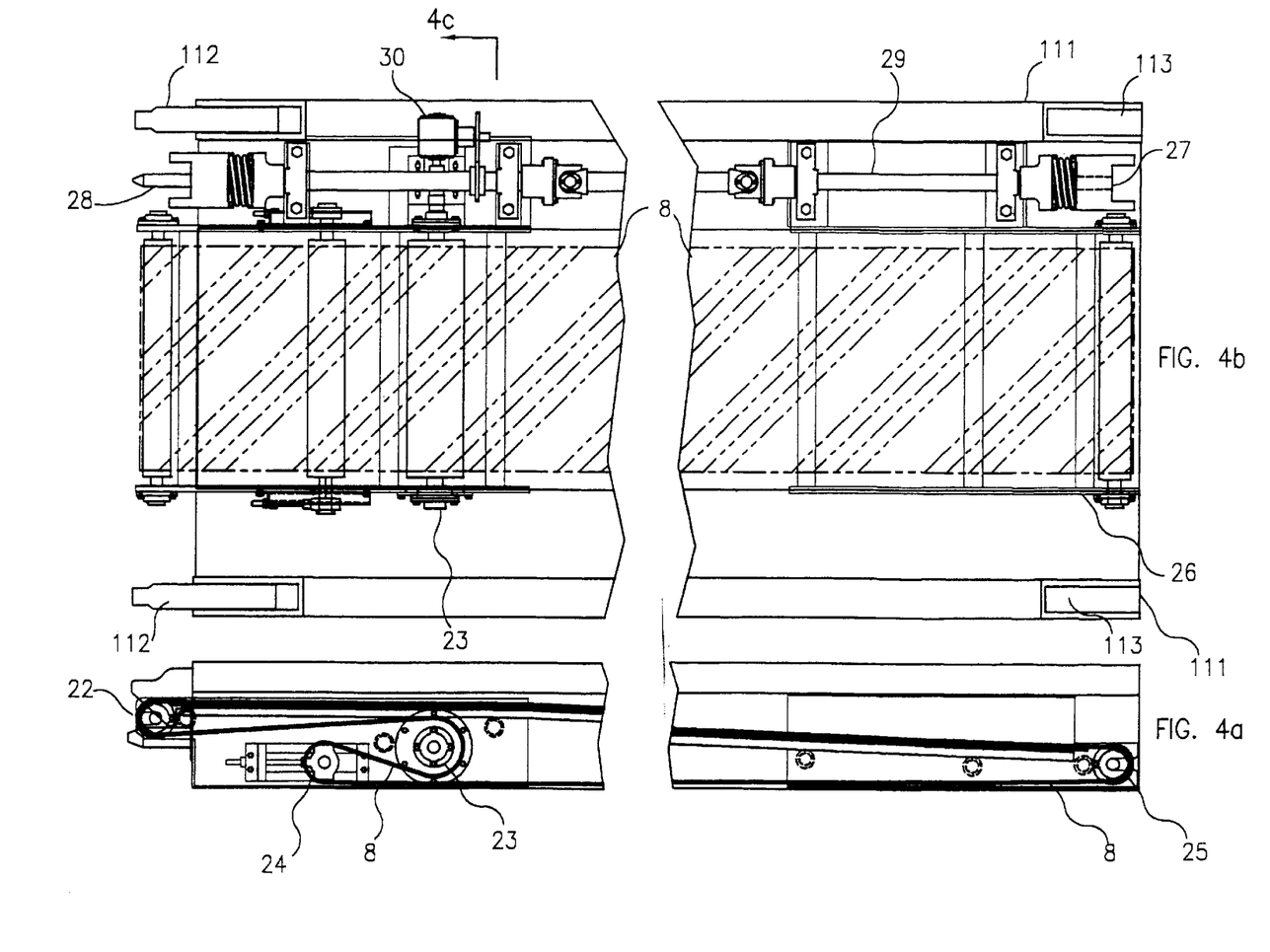

Referring now to FIGS. 4*a*–4*e*, FIG. 4*a* represents a side view of our conveyor unit, while FIG. 4*b* is an overhead view. The preferred unit is about 20 feet (6.09 meters) long and accordingly the views are broken to show the ends of the conveyor units in FIGS. 4*a* and 4*b*, as the central parts of the conveyor units comprise mainly the length of conveyor belt as may be seen in FIGS. 1 and 2. In FIG. 4*a*, the reader will appreciate that conveyor belt 8 (see FIG. 1) which is identical to conveyor belt 104 (see FIG. 3*a*) of conveyor unit 32, continues an unbroken inclined motion from right to left, around discharge head roller 22 back to drive roller 23, forward to takeup idler 24, and back to end roller 25 to pick up coal for taking to discharge roller 22.

The conveyor belt 8 and rollers 22, 23, 24, and 25 are mounted in belt box 26 which in turn is fixed to push beams 111 and covered by cover 128. Cover 128 protects the conveyor unit from loose rock falling from the roof of the mine. Push beans 111 are strong beams capable of transmitting the thrust for an entire chain of conveyor units, and the cutter head unit 5, into the mine with sufficient force to effect cutting the coal. Preferably, each beam has a pulling hook 129 and an alignment pin 112 (FIG. 4*d*) and complementary socket/pulling hook catch 113 to effect good connections for pushing; see FIGS. 4*d* and 4*e* for a detailed description of the connection.

In FIG. 4*b*, socket-containing coupler body 27, after receiving a complementary elongated member 28 from another conveyor unit in tandem, transmits the torque necessary to rotate the drive roller 23 in a manner similar to that described with respect to FIG. 3b. The torque is transmitted through shaft 29 to gear box 30 where it is appropriately converted to turn the drive roller 23.

Figure 4C:
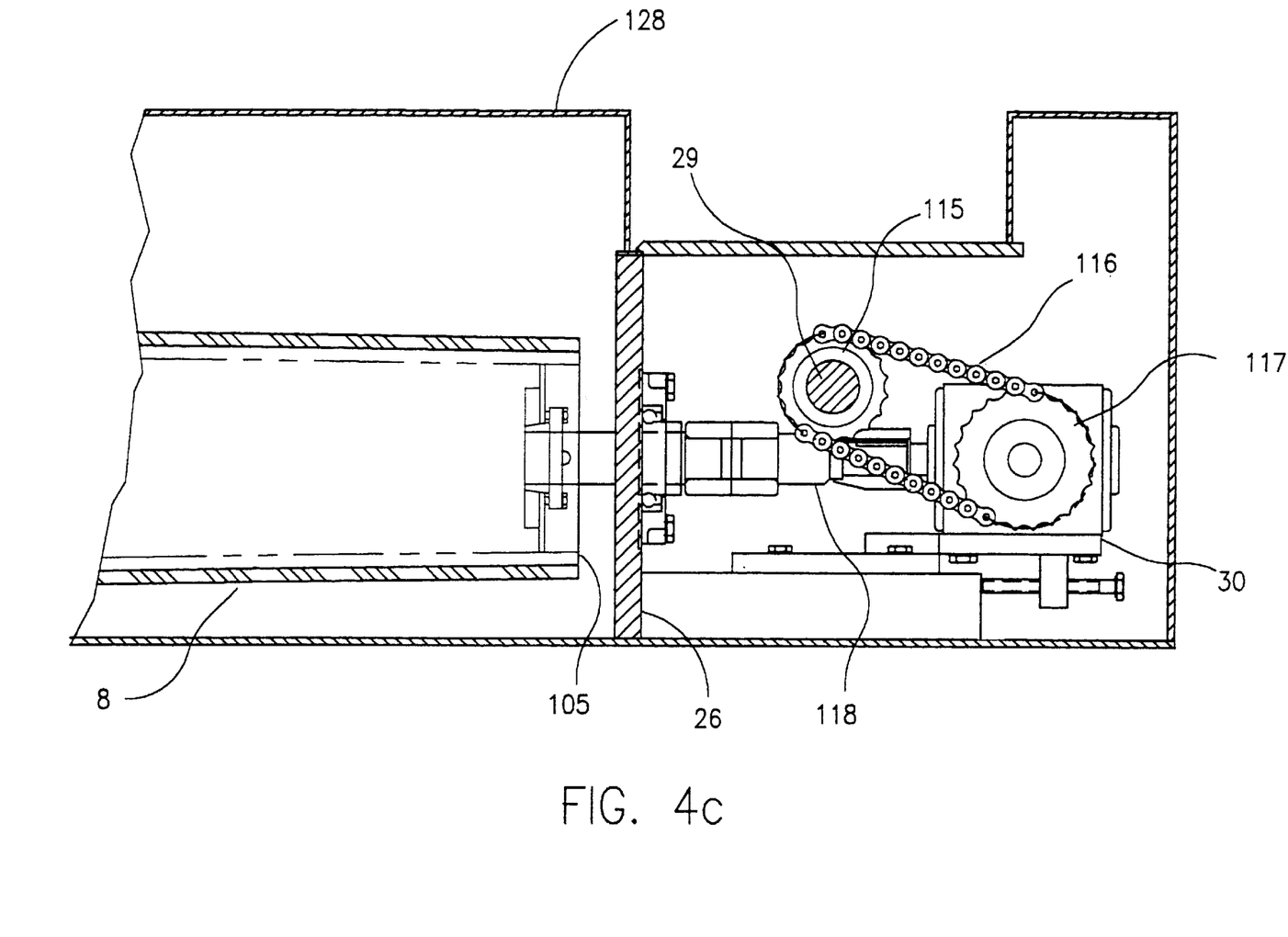
FIG. 4*c* shows the connection of the rotating power shaft to the belt drive.

FIG. 4c shows a transverse section of shaft 29 on which is mounted sprocket wheel. 115, in turn supporting chain drive 116, which rotates second sprocket wheel 117 on gear box 30. Gear box 30 converts the torque at right angles to turn drive roller 105 through coupling 118. Drive roller 105 is identical to drive roller 23 in FIGS. 4a and 4b, and in turn rotates belt 8 on the conveyor unit.

Figure 4D:
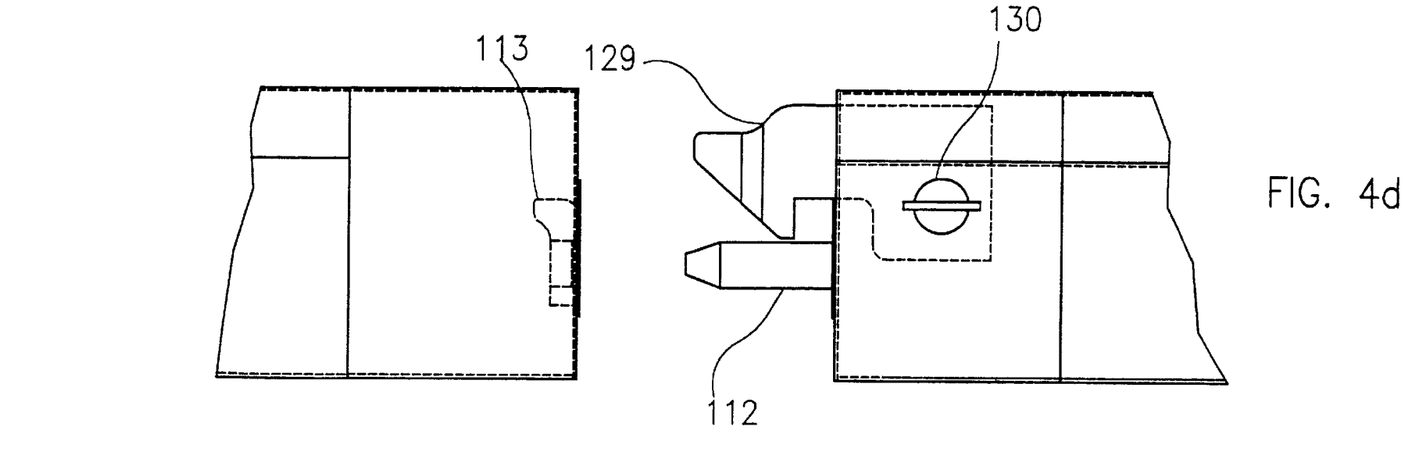
FIGS. 4*d* and 4*e* illustrate the connection between the push beams on two conveyor units.
Figure 4E:
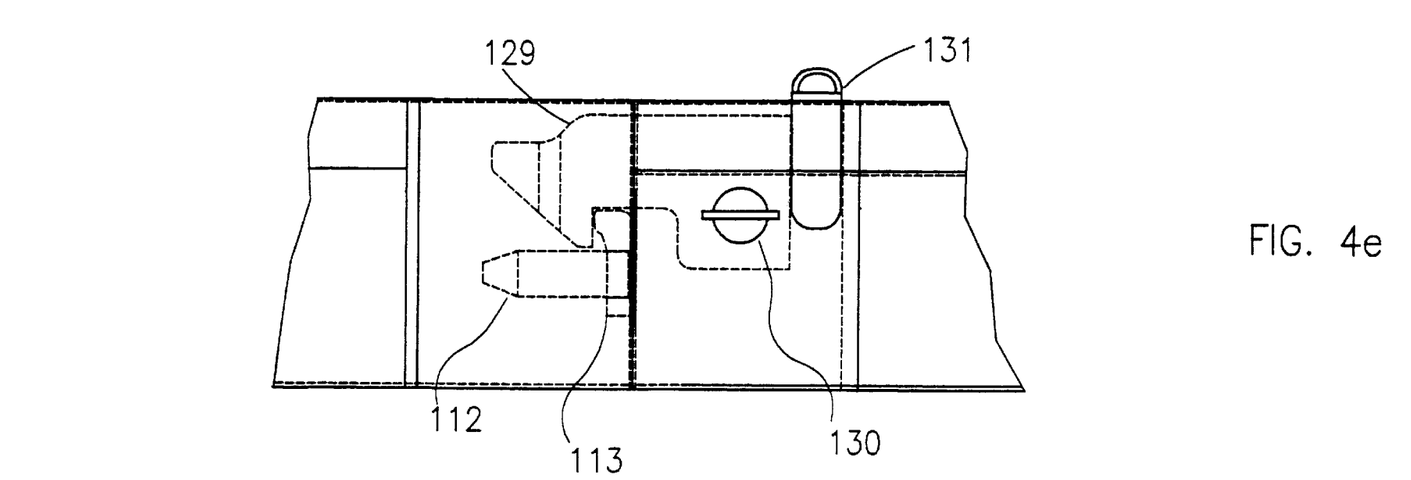

In FIGS. 4d and 4e, pulling hook 129 is seen to be mounted on a pivot 130 so that when alignment pin 112 is inserted in socket/pulling hook catch 113, the pulling hook 129 will engage the pulling hook catch 113 as shown in FIG. 4e. A locking block 131 may be inserted manually to ensure that the pulling hook 129 cannot disengage. With the pulling hook 129 in place as shown connecting push beams on each side of tandemly connected conveyor units, considerable force may be used to push or pull the conveyor units and the miner at the head of the train.

Figure 5A:
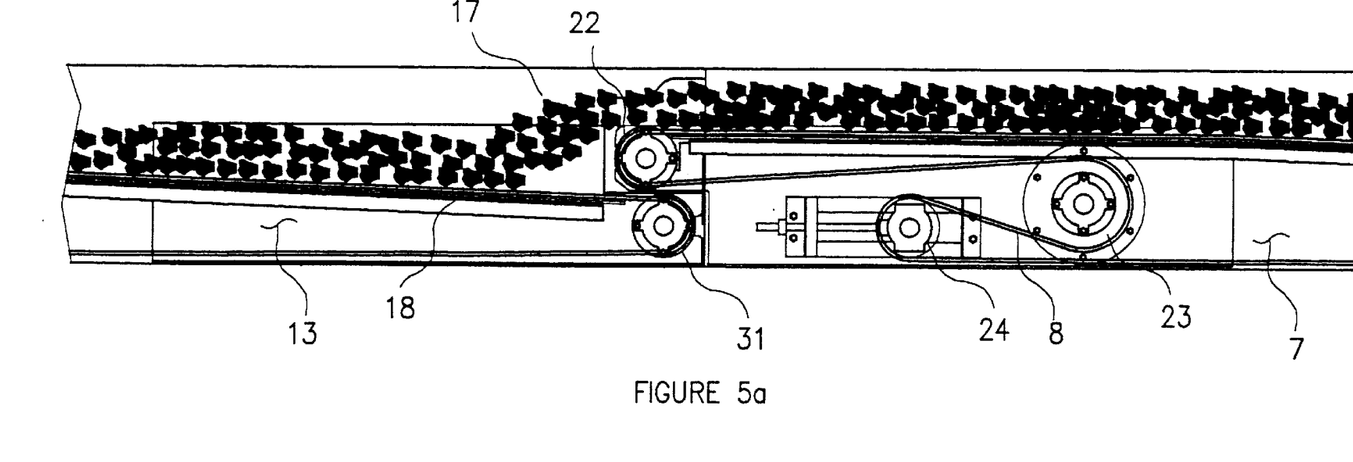
FIG. 5*a* is a side view of the operation of two connected conveyor units.

FIG. 5a shows the juxtaposition of conveyor units 7 and 13 depicted in FIGS. 1, 2, and 3. In FIG. 5a, the top (coal-bearing) portion of conveyor belt 8 on conveyor unit 7 moves at an inclined angle from right to left, proceeds around discharge head roller 22, depositing coal 17 on belt 18 of conveyor unit 13, then proceeds backwards to drive roller 23, then to takeup idler 24, and back to the right on the bottom of the unit. As shown on conveyor unit 13, the lower route of belt 18 goes around end roller 31 (equivalent to end roller 25 of conveyor unit 7 as shown in FIG. 4a). Coal is thus moved from the most remote conveyor unit to the next least remote unit and so on down the line of conveyor units connected in tandem.

Figure 5B:
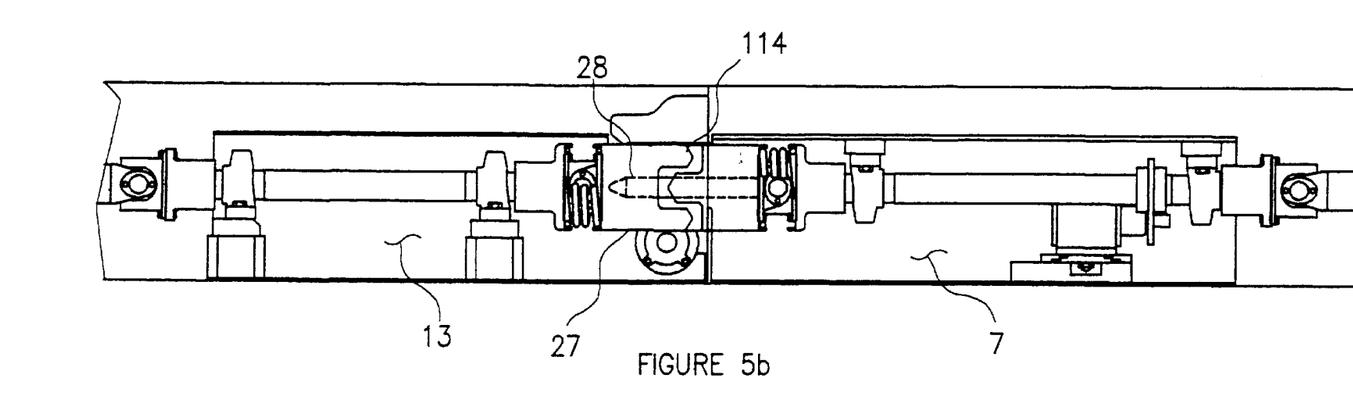
FIG. 5*b* shows the teeth of the couplings engaged to provide mechanical force transmission for the same units.
Figure 6:
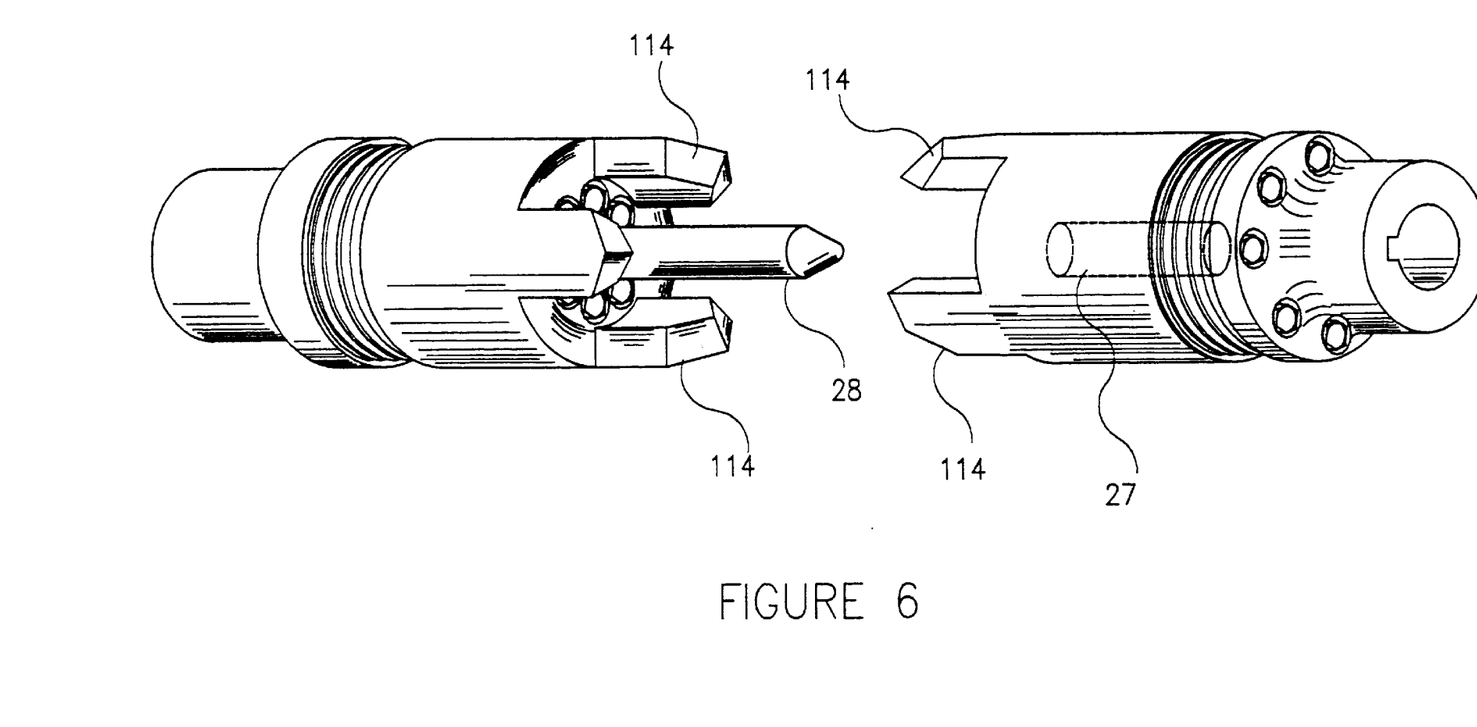
FIG. 6 shows the interlocking members of our preferred unique device for coupling and transmitting power to each conveyor unit.

FIGS. 5b and 6 show the operation of the coupling and transmission of rotating mechanical force from one unit to the next. Elongated member 28 on one conveyor unit is directed at receptacle 27 on another unit, thereby aligning the two coupling halves, and, once insertion is made, torque is easily transmitted through teeth 114 having surface areas designed to contact and act upon complementary surface areas on the opposing teeth 114.

It may be observed that each conveyor unit has three major components—a beam sometimes known as a push beam, strong enough to transmit the thrust necessary to move the train of conveyor units with the miner on the front end of the train, an endless conveyor belt mounted in a belt box, and a torque transmission apparatus for receiving rotational force from a conveyor unit in front, applying it to the endless belt in the conveyor unit, and transmitting it to the next conveyor unit behind. The functions and structure of the belt box and the push beam may be combined in a single unit; in any event the conveyor unit should be able to withstand the force and thrust necessary to move the cutter head into the seam, particularly when a large number of conveyor units are connected in tandem and the thrust supplied from outside the mine must be transmitted down the line to the cutter unit. The thrust transmitting portion of the belt box may be a beam positioned so that when the conveyor units are properly connected, the back end of one will receive thrust from the front end of the conveyor unit behind it. As illustrated in FIG. 4b, the preferred mode is to have a push beam on each side of the belt box 26. The belt box is or contains a frame for holding the endless belt (see FIGS. 4a–4c) and particularly the rollers on which it turns. At least two rollers are necessary, a relatively low receiving roller on the front end (the same end receiving rotational force) and a relatively high discharge roller on the rear end (the end transmitting rotational force), so that coal can be deposited from the belt as it goes around a discharge roller on the rear of a forward conveyor unit to a belt having just travelled around the front end roller of a conveyor unit behind it. The belt box may be constructed in such a way that it is strong enough to function as a beam; this variation is of course within our invention—that is, the beam may be an integral part of the belt box. Provision must still be made for supporting the rollers, however, and particularly where four rollers are used as illustrated in the drawings, a frame or form of belt box is necessary to support the belt rollers. The torque transmission apparatus comprises means for receiving rotational force from in front of the conveyor unit, ultimately from the motor mounted on the cutter head unit, means for converting the rotational force for use in rotating at least one drive roller mounted on the belt box for rotating the belt, and means for transmitting the rotational force down the line to the next conveyor unit for rotating its belt and those of all the conveyor units to follow.

While not essential to the basic function of moving coal out of the mine, the cover for the belt box (see cover 128 in FIG. 4b) is highly practical and useful to prevent jamming of the equipment by loose rock primarily from the mine roof. The cover will ideally be designed to protect the entire upper horizontal surface of each conveyor unit.

We claim:

1. A high wall mining machine launch vehicle for pushing a train of conveyor belt units headed by a cutter, said launch vehicle including means for introducing a new belt conveyor unit having a conveyor belt to the rear of said train and including means for mechanically starting the rotation of said conveyor belt in said new belt conveyor unit while in the process of adding it to said train.

2. A high wall mining machine launch vehicle of claim 1 wherein said means for mechanically starting the rotation of said conveyor belt includes a coupler for coupling with a conveyor belt rotation device on said new belt conveyor, and a motor for rotating said coupler.

* * * * *